(12) United States Patent
Saito

(10) Patent No.: US 9,678,415 B2
(45) Date of Patent: Jun. 13, 2017

(54) PROJECTOR DEVICE

(75) Inventor: Hideharu Saito, Hitachi (JP)

(73) Assignee: Hitachi Maxell, Ltd., Osaka (JP)

(*) Notice: Subject to any disclaimer, the term of this patent is extended or adjusted under 35 U.S.C. 154(b) by 459 days.

(21) Appl. No.: 14/359,397

(22) PCT Filed: Nov. 21, 2011

(86) PCT No.: PCT/JP2011/076840
§ 371 (c)(1),
(2), (4) Date: May 20, 2014

(87) PCT Pub. No.: WO2013/076800
PCT Pub. Date: May 30, 2013

(65) Prior Publication Data
US 2014/0333904 A1    Nov. 13, 2014

(51) Int. Cl.
*G03B 21/16*    (2006.01)

(52) U.S. Cl.
CPC .................. *G03B 21/16* (2013.01)

(58) Field of Classification Search
CPC .............................. H04N 9/3144; G03B 21/16
USPC ...................................... 353/58, 57
See application file for complete search history.

(56) References Cited

U.S. PATENT DOCUMENTS

| 2006/0066816 | A1  | 3/2006 | Horiguchi et al. |
| 2008/0231812 | A1* | 9/2008 | Sakai ................. H04N 9/3144 353/58 |
| 2008/0246896 | A1* | 10/2008 | Zheng .................. G03B 21/16 349/5 |
| 2010/0253924 | A1  | 10/2010 | Nishi et al. |
| 2012/0287408 | A1  | 11/2012 | Yamashita |

FOREIGN PATENT DOCUMENTS

| JP | 06-338212 A    | 12/1994 |            |
| JP | 2006-91610 A   | 4/2006  |            |
| JP | 2006-352203    | * 12/2006 | ............ G03B 21/00 |
| JP | 2006-352203 A  | 12/2006 |            |

(Continued)

OTHER PUBLICATIONS

Office Action Japanese Patent Application No. 2013-545678 dated Apr. 28, 2015.

(Continued)

*Primary Examiner* — Steven H Whitesell Gordon
*Assistant Examiner* — Jerry Brooks
(74) *Attorney, Agent, or Firm* — McDermott Will & Emery LLP

(57) ABSTRACT

In order to cool the discharge lamp, cooling air generated by first and second cooling fans conveyed via first and second ducts into first and second lamp-cooling air inlets of the discharge lamp, and is blown into the discharge lamp. The first and second lamp-cooling air inlets are disposed so as to be symmetrical with respect to the optical axis of the discharge lamp, and are divided into a plurality of air inlets each having different opening surface areas. Having passes through the plurality of air inlets and diverging into a plurality of air currents, the cooling air is respectively blown to different parts of the discharge lamp. The rotational frequency of the first and second cooling fans is optimally controlled in accordance with the installation position (S) of the projector device.

7 Claims, 12 Drawing Sheets

(56) References Cited

FOREIGN PATENT DOCUMENTS

| JP | 2008-262153 A | 10/2008 |
|---|---|---|
| JP | 2009-198640 A | 9/2009 |
| JP | 2010-244753 A | 10/2010 |
| WO | 2011/111186 A1 | 9/2011 |

OTHER PUBLICATIONS

International Search Report issued in International Application No. PCT/JP2011/076840 mailed Feb. 14, 2012, with English translation, 2 pgs.

* cited by examiner

STATIONARY INSTALLATION
($\theta = 0°$)

UPWARD-PROJECTING
INSTALLATION
($\theta = 90°$)

SUSPENDED INSTALLATION
($\theta = 180°$)

DOWNWARD-PROJECTING
INSTALLATION
($\theta = 270°$)

STATIONARY INSTALLATION
($\theta = 0°$)

UPWARD-PROJECTING
INSTALLATION
($\theta = 90°$)

SUSPENDED INSTALLATION
($\theta = 180°$)

DOWNWARD-PROJECTING
INSTALLATION
($\theta = 270°$)

PROJECTOR DEVICE 1' SIDE

- - - - ROTATIONAL FREQUENCY OF THE COOLING FAN 54'
——— ROTATIONAL FREQUENCY OF THE COOLING FAN 53'

STATIONARY INSTALLATION
($\theta = 0°$)
DEVICE 1' SIDE

UPWARD-PROJECTING
INSTALLATION
($\theta = 90°$)
DEVICE 1' SIDE

SUSPENDED INSTALLATION
($\theta = 180°$)
DEVICE 1' SIDE

DOWNWARD-PROJECTING
INSTALLATION
($\theta = 270°$)
DEVICE 1' SIDE

PROJECTOR DEVICE

RELATED APPLICATIONS

This application is the U.S. National Phase under 35 U.S.C. §371 of International Application No. PCT/JP2011/076840, filed on Nov. 21, 2011, the of which is incorporated by reference herein.

TECHNICAL FIELD

The present invention relates to a projector device which projects an image by use of a discharge lamp as an optical source, and particularly to a cooling mechanism which suitably cools the discharge lamp.

BACKGROUND ART

A projector device is a device that collects light emitted from an optical source by means of a reflecting mirror and a lens for example, directs the light thus collected to a display element such as a liquid crystal panel to form an optical image, and projects the optical image to an outside screen or other displays via a projection lens and a projection mirror. A discharge lamp such as a high-pressure mercury lamp is generally used as the optical source of the projector device. The discharge lamp is covered with a reflector from the back and an explosion-proof glass from the front so as to have a nearly hermetically sealed form. The discharge lamp, heated to a high temperature during lighting, is set up at an appropriate temperature. However, if the discharge lamp is continuously used at temperatures exceeding the appropriate temperature, the life of the lamp will be shortened and the lamp itself might burst or be unlighted. A cooling mechanism adapted to perform forced cooling using a fan is provided in order to keep the discharge lamp at an appropriate temperature. Heat generation along with light emission causes heat convection inside the discharge lamp, such that the upper part (the upper part as viewed in the direction of gravitational force) of a spherical light-emitting part is heated to a high temperature. The upper part is cooled more strongly than the lower part, thereby keeping a temperature difference between the upper part and the lower part within a predetermined range.

The installing forms of the projector device generally include stationary installation in which the projecting device is horizontally placed on a disk and suspended installation in which the projector device is suspended from a ceiling. In the suspended installation, the projector device is attached in an upside-down manner. Other installation methods include an upward-projecting position and a downward-projecting position as the forms where an image is projected in a direction vertical to, i.e., generally perpendicular to the upper surface of a disk (in an up-down direction).

It is necessary to suitably cool a discharge lamp in any of the various installing forms described above. To meet the necessity, patent document 1 discloses a cooling device for a discharge lamp (the optical source lamp) having a plurality of cooling fans which deliver air to an optical source lamp, the cooling fans delivering the air in a direction configured to be different from each other.

CITATION LIST

Patent Literature

PTL 1: JP-2008-262153-A

SUMMARY OF INVENTION

Technical Problem

Highly-functional projector devices are requested to be capable of being installed in not only the above-mentioned stationary installation, the suspended installation, or the vertically- (up-down-directionally-) projecting installation but also any inclined surface (0 to 360 degrees) so as to project an image in any direction. To meet the requirement, the optical axis of the discharge lamp mounted in the projector device is constantly maintained in a horizontal direction (parallel to the ground surface) and turns by an inclination angle in accordance with each of the installing forms (inclination angles). In this way, portions corresponding to the upper part and lower part of a bulb, which are important in the discharge lamp to be cooled, are not fixed and are moved around the optical axis depending on the installation status. Thus, the discharge lamp needs to keep an appropriate temperature in a constant manner in the situations where the upper part and lower part of the bulb are moved between 0 to 360 degrees depending on the installation status.

In the technique described in patent document 1, the discharge lamp is cooled by two currents of air delivered in opposite directions, the air flow directions are made offset from each other, and the amounts of air flow are controlled according to the respective installation positions of the device. A temperature difference between the upper part and lower part of the projector device is thereby maintained appropriately. However, the technique described in patent document 1 is such that the air flow directions are arranged to be offset from each other; therefore, it is difficult for the cooling air to cover the full circumference of the bulb. Consequently, in the installation position in which the installation plane is inclined at a middle angle, e.g. 135 degrees, the temperature difference between the upper part and lower part of the bulb is likely to deviate from the appropriate temperature. Alternatively, the amount of air flow is so excessive that the noise of the cooling fan is expected to be louder to bring the discharge lamp close to the appropriate temperature. In the technique described in patent document 1, the air course opening is narrowed at the outlet to make two currents of air delivered to the discharge pump offset from each other. This shape adds a loss of air course. The rotational frequency of the fan is increased accordingly, which leads to the greater noise of the projector device.

It is an object of the present invention to provide a projector device equipped with a cooling mechanism which continuously maintains the temperature difference between a bulb upper part and a bulb lower part in a discharge lamp within an appropriate range even when the projector device is installed at an arbitrary inclination angle.

Solution to Problem

A projector device according to the present invention includes: a cooling mechanism for leading cooling air generated by first and second cooling fans to first and second lamp-cooing air inlets via first and second ducts, respectively, and blowing the cooling air to the discharge lamp in order to cool the discharge lamp; an installation angle sensor for detecting an installation position of the projector device; and a cooling control section for controlling rotational frequencies of the first and second cooling fans in accordance with the installation position detected by the installation angle sensor. The first and second lamp-cooing air inlets are disposed symmetrically with respect to an optical axis of the discharge lamp. The first and second lamp-cooing air inlets are each divided into a plurality of air inlets having a different opening area from each other. Cooling air divided into a plurality of currents of the cooling air through the plurality of air inlets is blown to different parts of the discharge lamp.

A portion of the cooling air divided into the plurality of currents is blown to a bulb of the discharge lamp and the cooling control section controls the first and second cooling fans so that an amount of cooling air for an upper part of the bulb in a direction of gravitational force depending on the installation position of the projector device may be greater than an amount of cooling air for a lower part of the bulb in the direction of gravitational force.

Advantageous Effects of Invention

According to the present invention, a temperature difference between the bulb upper part and bulb lower part of the discharge lamp can continuously be maintained within an appropriate range even when the projector device is installed at an arbitrary inclination angle. A loss of the lamp-cooing air course can be reduced as well, whereby the rotational frequency of the cooling fan can be suppressed. The longer life of the discharge lamp and the reduced noise of the projector device can be thereby realized.

DESCRIPTION OF EMBODIMENTS

Embodiments of the present invention will hereinafter be described with reference to the drawings. Parts having common functions in the all figures are provided with like symbols.

Example 1

Figure 1:
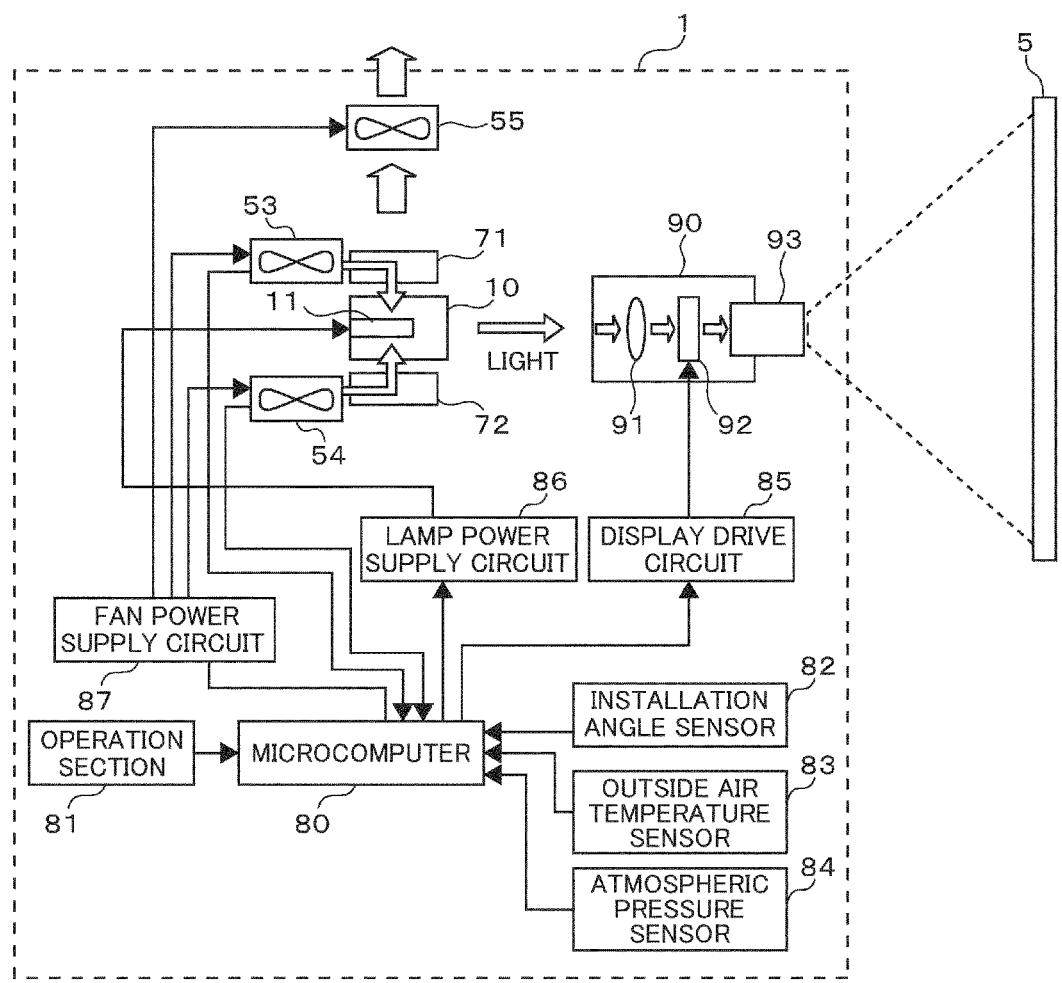
FIG. 1 is an overall configuration block diagram illustrating Example 1 of a projector device according to the present invention.

FIG. 1 is an overall configuration block diagram illustrating Example 1 of a projector device according to the present invention. A description is given of the basic configuration and operation of the projector device 1.

In an optical system, light L emitted from a discharge lamp 11 of a lamp unit 10 enters an optical unit 90. The optical unit 90 includes an illumination optical system 91, a display panel 92 composed of e.g. liquid crystal display elements, and a projection lens 93. The illumination optical system 91 equalizes the light quantity distribution of the light L from the lamp unit 10 and directs the light L thus equalized to the display panel 92. The display panel 92 is driven by the display drive circuit 85 to form an optical image according to video signals. The optical image of the display panel 92 is projected on an outside screen 5 or the illumination surface of a wall surface by means of the projection lens 93.

A cooling mechanism includes two cooling fans 53, 54 for cooling the inside of the lamp unit 10 and a cooling fan 55 configured to cool the surface of a shell of the lamp unit 10. A fan power circuit 87 delivers electricity to the fans 53, 54, 55. Cooling air delivered from the cooling fans 53 and 54 is supplied to the lamp unit 10 via ducts 71 and 72, respectively, to cool the discharge lamp 11. An installation angle sensor 82 detects the installation angle of the projector device 1. An outside air temperature sensor 83 detects outside air temperature around the projector device 1. An atmospheric pressure sensor 84 detects atmospheric pressure around the projector device 1. Such detection inform is used for the rotation control of the cooling fans 53, 54.

The projector device 1 is controlled by an arithmetic and control means (a microcomputer) 80 including a CPU (Central Processing Unit) which operates following a program stored in a ROM (Read Only Memory). The microcomputer 80 executes predetermined processing through user button operation from an operating unit 81, the processing is, for example, the microcomputer 80 turning on or off the discharge lamp 11 via the lamp power circuit 86. In addition, the microcomputer 80 operates or stops the cooling fans 53, 54 for cooling the inside of the lamp unit 10 and the cooling fan 55 for cooling the surface of the shell via the fan power circuit 87 in conjunction with the turning on and off of the discharge pump 11. In this case, the operation of the cooling fans 53, 54 for cooling the inside of the lamp unit 10 is controlled on the basis of detection inform from the installation angle sensor 82, the outside air temperature sensor 83, and the atmospheric pressure sensor 84. The microcomputer 80 controls the display drive circuit 85 to display images in accordance with video signals.

Figure 2:
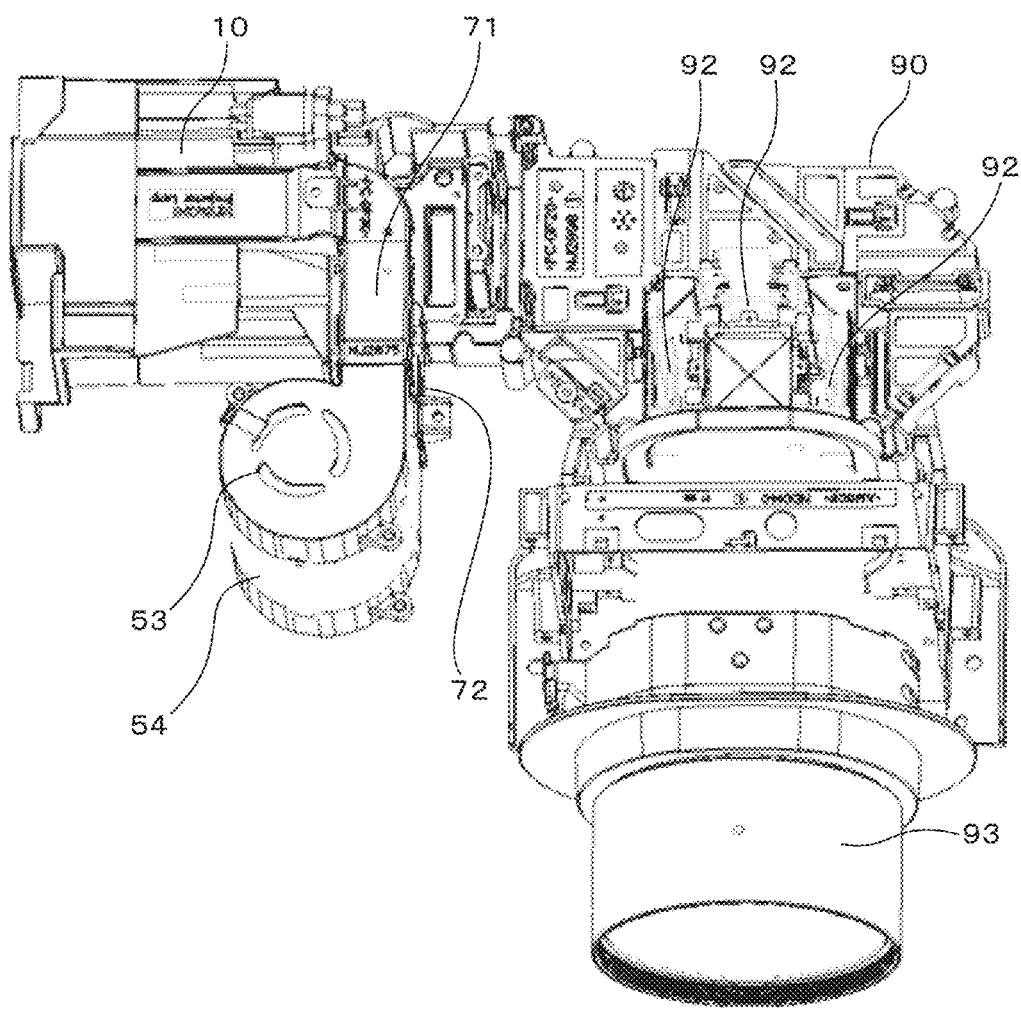
FIG. 2 is an external view of an optical system and a cooling mechanism in the projector device.

FIG. 2 is an external view of the optical system and the cooling mechanism in the projector device. Their main configurations are as below. The two cooling fans 53, 54 and the ducts 71 and 72 connected to the cooling fans 53 and 54, respectively, are mounted on the lamp unit 10. The optical unit 90 has three display panels 92 for three primary colors (R, G, and B) and the projection lens 93. The illumination light emitted from the lamp unit 10 is formed as optical images of R, G, and B through the three display panels 92 in the optical unit 90. These optical images are synthesized and projected from the projection lens 93. In the following description, coordinate axes are defined as illustrated. An emitting direction from the lamp unit 10 is defined as an X-axis. A projection direction from the projection lens 93 is defined as a Z-axis. A direction perpendicular to these axes (a direction vertical to the sheet surface) is defined as a Y-axis. Specifically, the emitting direction (+X direction) from the lamp unit 10 and the projection direction (+Z direction) from the projection lens 93 are perpendicular to each other.

The two cooling fans 53, 54 for cooling the inside of the lamp unit 10 are disposed on the side of the projection lens 93 to effectively utilize the inside space of the projector device 1 and are configured as two stories in the Y direction. An upper stage side (+Y side) is the first cooling fan 53 and a lower stage side (−Y side) is the second cooling fan 54. Cooling air from the cooling fans 53 and 54 is supplied to the lamp unit 10 via the first and second ducts 71 and 72, respectively. In this regard, the direction of the cooling air is bent at approximately 90 degrees from the −Z direction to the −X direction by means of the ducts 71, 72. The cooling air delivered from the first cooling fan 53 via the duct 71 (the first air course) is supplied to the upper part (+Y side) of the lamp unit 10. The cooling air delivered from the second cooling fan 54 via the duct 72 (the second air course) is supplied to the lower part (−Y side) of the lamp unit 10. The first and second air courses are symmetrically configured to face each other in the Y direction and to have the same length. This equal length intends to facilitate blast control on the two cooling fans 53, 54 for the various, i.e., 360 degrees, installation positions of the projector device.

Figure 3:
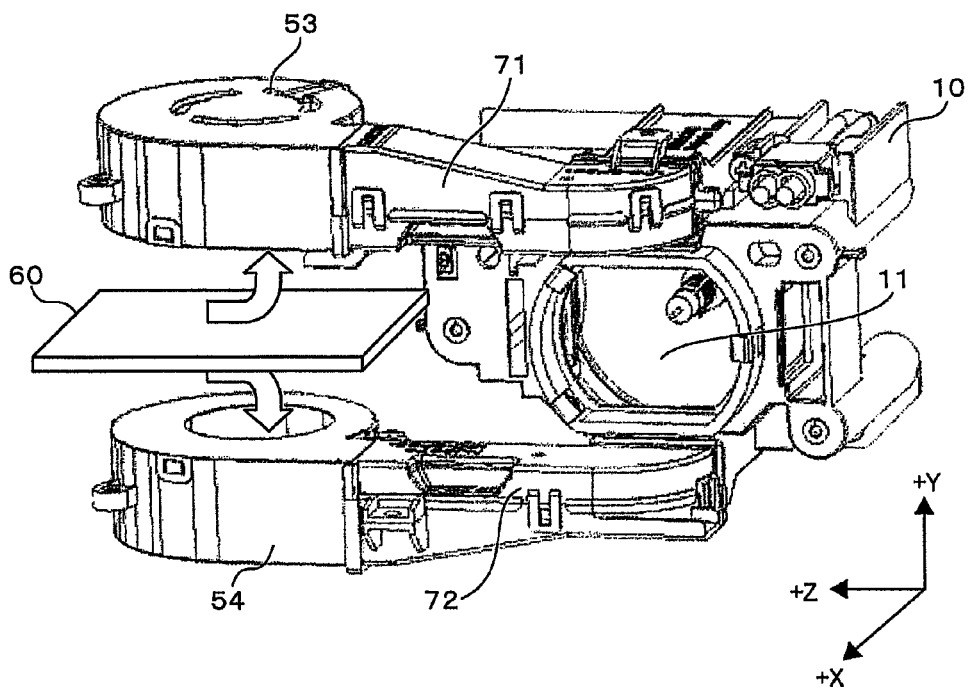
FIG. 3 is a perspective view of a lamp unit and the cooling mechanism for the lamp unit.

FIG. 3 is a perspective view of the lamp unit 10 and the cooling mechanism therefor. The lamp unit 10 has the discharge lamp 11 which generates light in the +X direction. The first air course consisting of the first cooling fan 53 and the duct 71 is connected to the upper part (+Y side) of the lamp unit 10. The second air course consisting of the second cooling fan 54 and the duct 72 is connected to the lower part (−Y side) of the lamp unit 10. The first air course and the second air course have the symmetrical configuration with respect to the X-Z plane. To that end, fans that have mirror symmetry and the same performance are used as the two cooling fans 53, 54. Air inlets for the cooling fans 53, 54 are provided on space sides where they face each other so as to keep the symmetry of the two air courses. Further, a division plate 60 is installed in the middle of the space (the air intake space) where the cooling fans 53, 54 face each other, thereby preventing the operations (the amount of air supply) of the cooling fans 53, 54 from interfering with each other.

In the discharge lamp 11, the upper part (the upper part as viewed in the direction of gravitational force) of a spherical light-emitting portion (a bulb) is subjected to high temperature. Therefore, the upper part is more cooled than the lower part to maintain a difference in temperature between the upper part and the lower part within a predetermined range. A connection portion (a seal part) between the electrode of the discharge lamp 11 and an outside lead rod is cooled so as to keep an appropriate temperature as well. The life (e.g. approximately 3000 to 5000 hours) of the discharge lamp is thereby ensured. In addition, the early illuminance degradation, burst, non-lighting, and other troubles of the discharge lamp are prevented.

Figure 4:
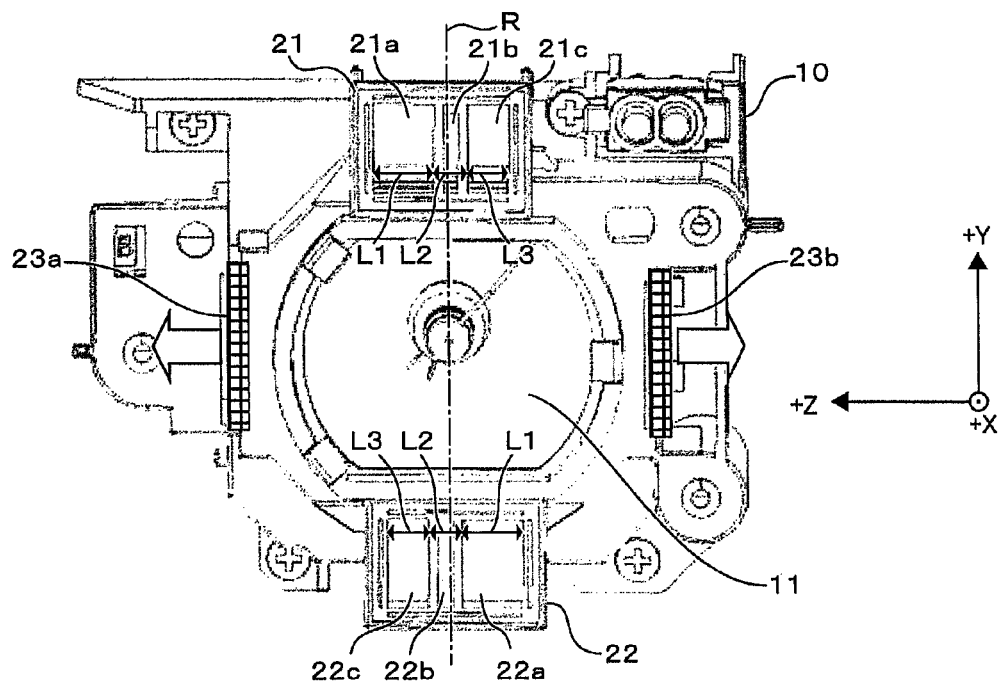
FIG. 4 illustrates cooling air inlets of the lamp unit as viewed from the lamp-emission side.

FIG. 4 illustrates the configuration of the connection portion with the ducts 71, 72 when the cooling air inlets of the lamp unit 10 are viewed from the lamp-emission side (the X direction). The lamp unit 10 has at its upper part a first lamp-cooing air inlet 21 serving as a connection portion with the first duct 71 and at its lower part a second lamp-cooing air inlet serving as a connection portion with the second duct 72. In other words, the first and second cooling air inlets 21, 22 are arranged symmetrically with respect to the optical axis of the discharge lamp 11. The cooling air delivered from the first cooling fan 53 is supplied to the discharge lamp 11 in the lamp unit 10 from the first lamp-cooing air inlet 21 via the duct 71. The cooling air delivered from the second cooling fan 54 is supplied to the discharge lamp 11 in the lamp unit 10 from the second lamp-cooing air inlet 22 via the duct 72. The air that has cooled the discharge lamp 11 is discharged from lamp cooling discharge outlets 23a, 23b located on both side surfaces (+Z, and −Z directions) of the lamp unit 10.

Further, the first lamp-cooing air inlet 21 is internally provided with division plates so as to be divided into three air inlets 21a, 21b, 21c. The opening areas of the air inlets are different from one another. Their division widths are set to L1, L2, and L3. Similarly, the second lamp-cooing air inlet 22 is internally provided with division plates so as to be divided into three air inlets 22a, 22b, 22c. The division widths of the air inlets are equal to those of the first lamp-cooing air inlet 21, that is, are set to L1, L2, and L3. The division widths L1, L2, L3 of the first lamp-cooing air inlet 21 and those of the second lamp-cooing air inlet 22 are, however, arranged inversely to each other with respect to a centerline R (in short, they are arranged symmetrically about a point with respect to the center of the discharge lamp 11). The ratio of the division widths (the ratio of opening areas) determines the ratio of the amounts of cooling air to be blown to the bulb upper part and bulb lower part of the discharge lamp 11 and the seal part described later. The ratio of specific division widths in the present example has the relationship of e.g. L1:L2:L3 =1.5:0.35:1. Yet this ratio may be determined in accordance with the characteristics of the discharge lamp 11.

Figure 5:
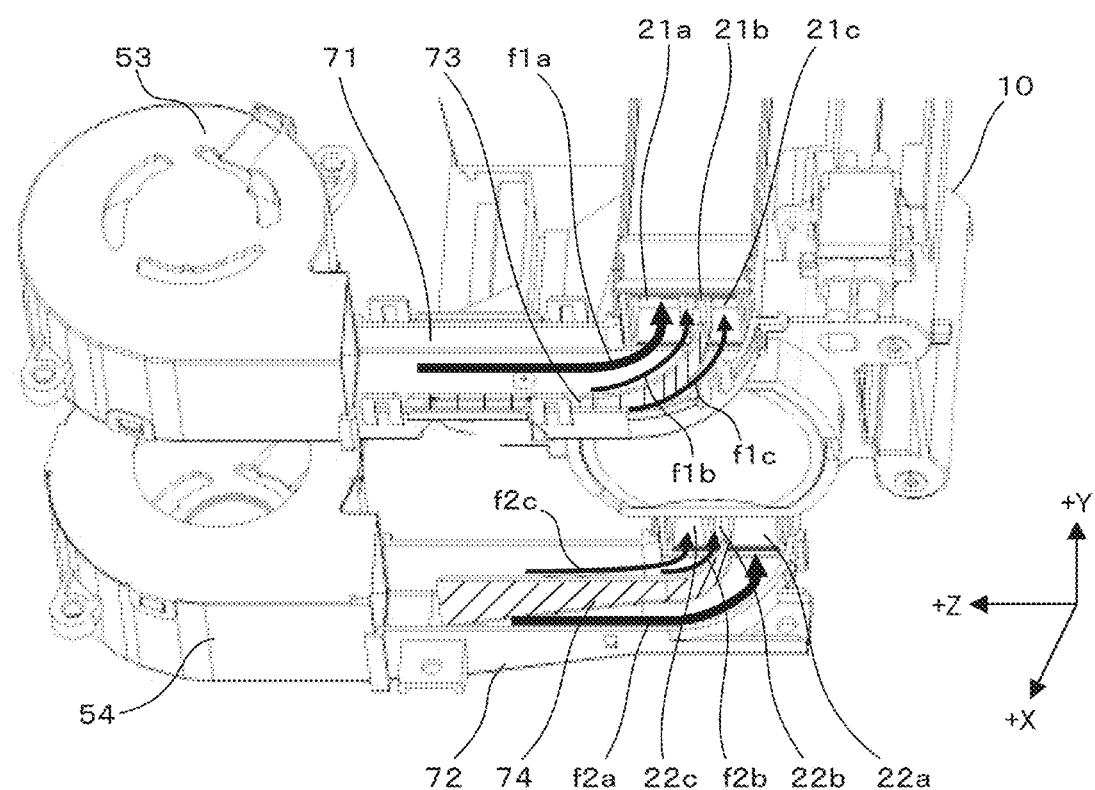
FIG. 5 illustrates an internal structure of ducts and currents of cooling air.

FIG. 5 illustrates the internal configuration of the ducts 71, 72 and the current of cooling air. The first and second ducts 71 and 72 are internally provided with flow guide ribs (flow guide plates) 73 and 74, respectively, for guiding the cooling air delivered from the cooling fans 53, 54. The cooling air delivered to the lamp-cooing air inlet 21 via the duct 71 is divided into three cooling air currents f1a, f1b, f1c by the three air inlets 21a, 21b, 21c of the lamp-cooing air inlet 21 and supplied to the discharge lamp 11. Similarly, the cooling air delivered to the lamp-cooing air inlet 22 via the duct 72 is divided into three cooling air currents f2a, f2b, f2c by the three air inlets 22a, 22b, 22c of the lamp-cooing air inlet 22 and is supplied to the discharge lamp 11.

The cooling air in the ducts 71 and 72 is delivered in the −Z direction from the cooling fans 53 and 54, respectively. The direction of the cooling air thus delivered is bent at approximately 90 degrees to be −X direction and then the cooling air flows toward the lamp-cooing air inlets 21, 22. The flow of the cooling air has a vector components of (−X, −Z) and produces deviation in the duct as a result. Thus, the amounts of the cooling air f1a, f1b, f1c; f2a, f2b, f2c divided in the lamp-cooing air inlets 21, 22 are not as the ratio of the division widths L1:L2:L3. Specifically, the amounts (f1c and f2a in this case) of cooling air in the air inlets on the outside of the curves of the ducts will be greater than those on the inside of the curves. To eliminate the influence of the vector component, the flow guide ribs 73, 74 are installed inside the respective ducts 71, 72. Because of the installation of the flow guide ribs 73, 74, the deviation of the cooling air in the ducts can be modified to bring the amounts of the cooling air f1a, f1b, f1c; f2a, f2b, f2c close to the ratio of the division widths L1:L2:L3.

In this example the single flow guide rib is installed in the single duct. Flow guide action will be more improved if two of the flow guide ribs are installed in such a manner as to match the widths of the three air inlets.

Figure 6A:
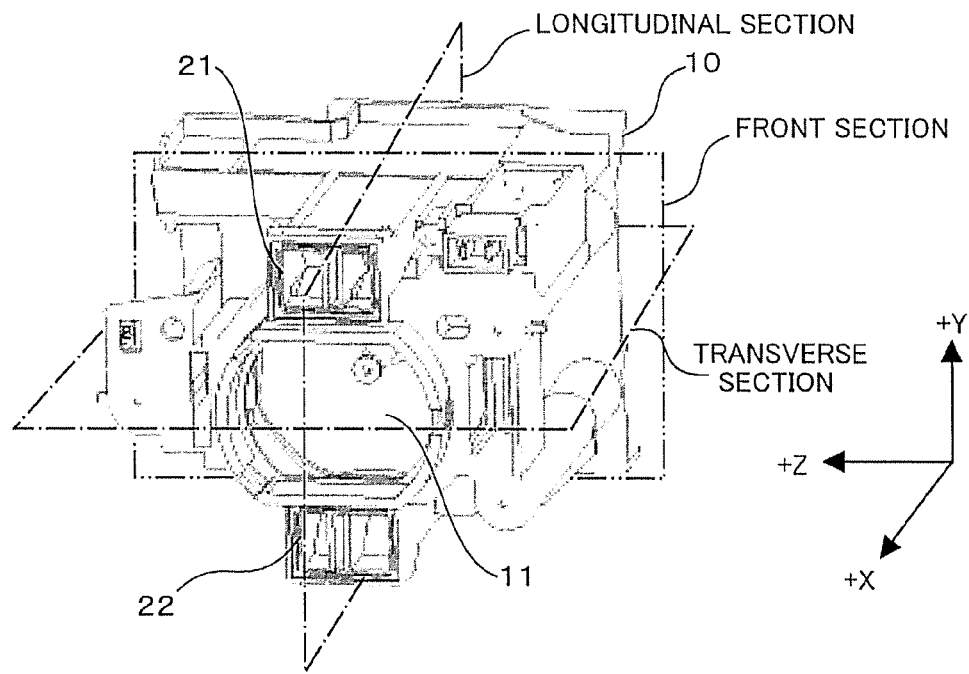
FIG. 6A illustrates an internal structure of the lamp unit and the currents of cooling air (a perspective view).
Figure 6B:
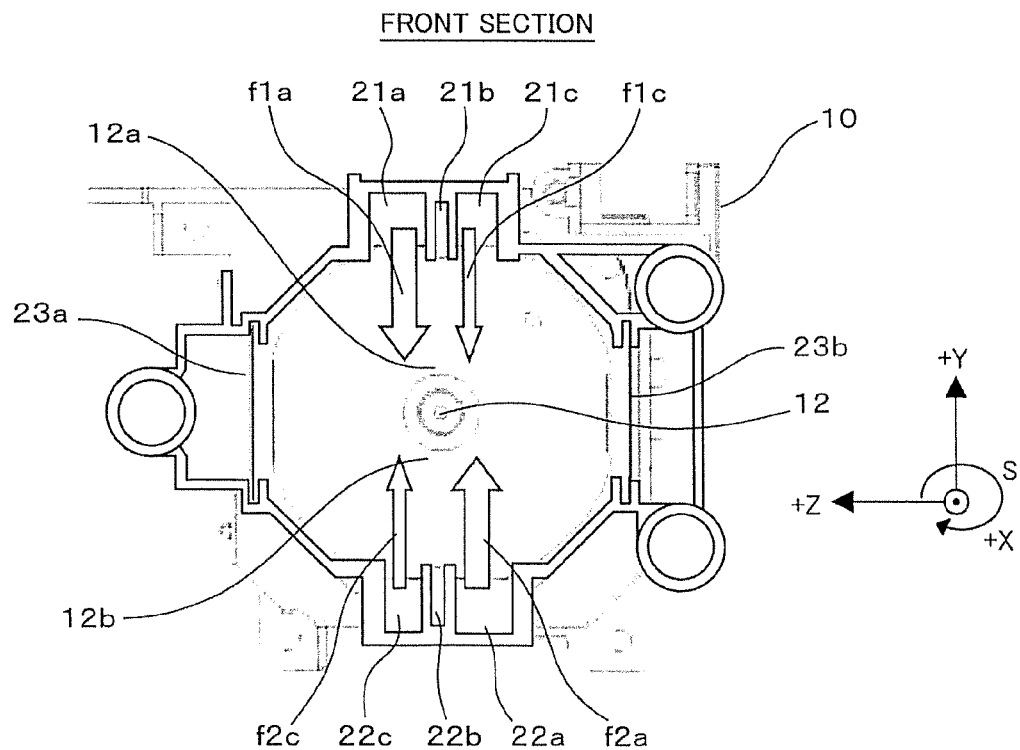
FIG. 6B illustrates the internal structure of the lamp unit and the currents of cooling air (a front cross-sectional view).
Figure 6C:
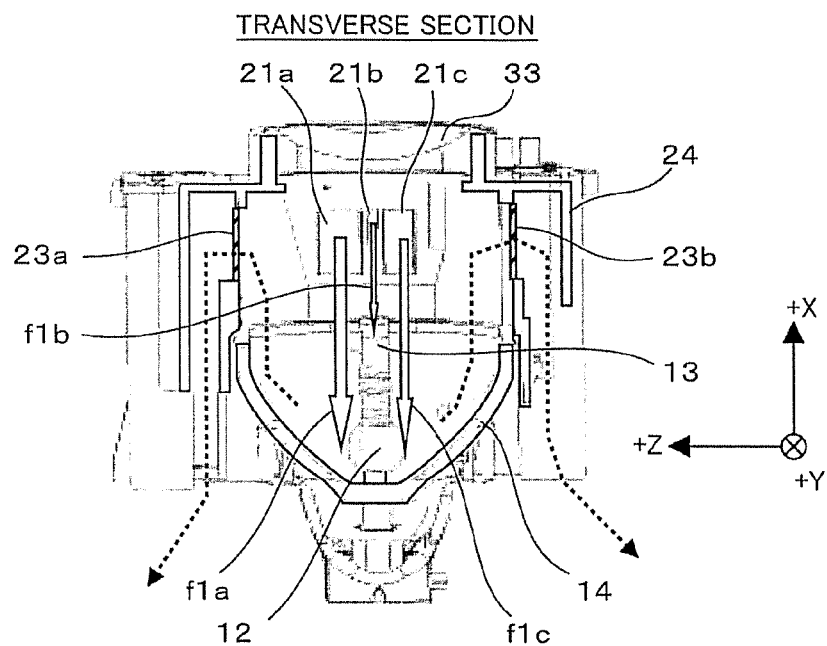
FIG. 6C illustrates the internal structure of the lamp unit and the currents of cooling air (a cross-sectional view).
Figure 6D:
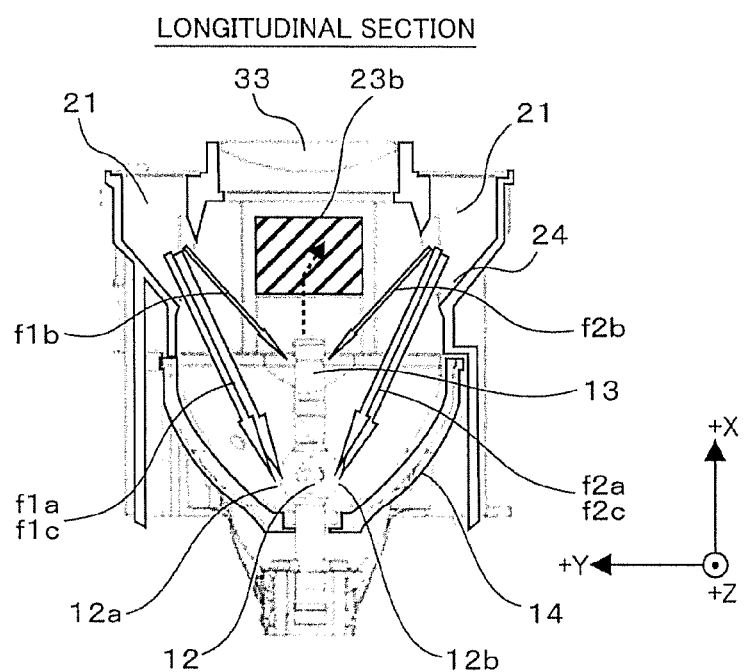
FIG. 6D illustrates the internal structure of the lamp unit and the currents of cooling air (a longitudinal cross-sectional view).

FIGS. 6A-6D illustrate the internal configuration of the lamp unit 10 and the flow of lamp-cooing air. FIG. 6A is an overall perspective view of the lamp unit 10. FIG. 6B is a front cross-sectional view (a Y-Z cross-sectional view). FIG. 6C is a transverse cross-sectional view (an X-Z cross-sectional view). FIG. 6D is a longitudinal cross-sectional view (an X-Y cross-sectional view).

A description is first given of the internal configuration of the discharge lamp 11. As illustrated in FIGS. 6C and 6D, the discharge lamp 11 includes: a bulb 12 which is a spherical light-emitting portion; a reflector 14 disposed to cover the bulb 12 from the back; and a translucent explosion-proof glass 33 disposed on the front opening side of the reflector 14. The discharge lamp 11 (the bulb 12) such as a short arc type (e.g. an arc length of 0.5 to 1.5 mm) extra high pressure mercury lamp, a metal halide lamp, and a xenon lamp is used for the projector device. An extra high pressure mercury lamp (an arc length of approximately 1.2 mm) of a lamp input of 330 W is used as an example; however, the present invention is not limited to this. The bulb 12 is disposed in the space surrounded by the reflector 14 and the explosion-proof glass 33 and is heated to an extremely high temperature because of the large electricity used. The seal part 13 is a place where two dissimilar metals, i.e., the electrode in the lamp and a lead wire on the outside of the lamp, are welded and sealed with glass. The reflector 14 is heated to a high temperature of approximately 250° C. by way of the heat generation of the bulb 12. The cooling fan 55 is used to cool the surface of the shell of the reflector 14. The explosion-proof glass 33 is adapted to prevent the scattering of broken pieces when the bulb 12 is exploded. The explosion-proof glass 33 is secured to a securing frame 24 by means of an adhesive or a spring, for example. A high heat-resistance such as PPS material (polyphenylene sulfide) is used for the securing frame 24 since this securing frame 24 comes into contact with the reflector 14 heated to a high temperature.

The temperature of the bulb 12, giving a great influence on the life of the discharge lamp, has a predetermined temperature specification defined in the bulb. Because of the light-emitting principle of the discharge lamp, the bulb upper part 12a located at a higher position in terms of gravitational force is heated to the highest temperature. The temperature specifications have provisions on a temperature difference between the absolute temperature of the bulb upper part 12a and the bulb lower part 12b. In general specifications, if the temperature of the bulb upper part 12a is 860° C. or lower, a temperature difference between the bulb upper part 12a and the bulb lower part 12b is approximately 60 to 100° C. Temperature specifications are also defined in the seal part 13 in addition to the bulb temperature. A welded point could be oxidized for fracture if the seal part 13 is heated to a high temperature. It is therefore necessary to constantly keep the seal part 13 at 350° C. or lower. These temperature specifications depend on the types of discharge lamps and are not fixed values.

In the present example, the lamp-cooing air f1a, f1b, f1c and f2a, f2b, f2c is led from the lamp-cooing air inlets 21 and 22, respectively, to the space where the bulb 12 is disposed in order to cool the bulb 12 and the seal part 13. The air that has cooled the bulb 12 and the seal part 13 is discharged from the lamp cooling discharge outlets 23a, 23b. A description will be given of the air course of the cooling air.

In FIGS. 6B, 6C, and 6D, the air inlets 21a, 21c of the lamp-cooing air inlet 21 each have an inclination of approximately 30 degrees in the −Y direction so as to lead the cooling air f1a, f1c to the bulb (the light-emitting portion) 12 of the discharge lamp 11. The air inlet 21b has an inclination of approximately 40 degrees in the −Y direction to lead the cooling air f1b to the seal part 13 of the discharge lamp 11. Similarly, the air inlets 22a, 22c of the lamp-cooing air inlet 22 has an inclination of approximately 30 degrees in the +Y direction to lead the cooling air f2a, f2c to the bulb 12 of the discharge lamp 11. The discharge outlet 22b has an inclination of approximately 40 degrees in the +Y direction to lead the cooling air f2b to the seal part 13 of the discharge lamp 11. The cooling air f1a and f1c led from the air inlets 21a and 21c is blown around the bulb 12 at a position offset in the Z direction, respectively. The same holds true for the cooling air f2a and f2c led from the air inlets 22a and 22c, respectively. The inclination angle (approximately 30 degrees) of each of the air inlets 21a, 21c, 22a, 22c and the inclination angle (approximately 40 degrees) of each of the air inlets 21b, 22b are values dependent on the configurations of the lamp unit 10 and the discharge lamp 11 to be used. Such inclination angles need only to be determined appropriately.

The installation positions in FIGS. 6A to 6D are in the status of stationary installation and the gravitational direction takes the −Y direction. In this case, the bulb upper part 12a is cooled by the cooling air f1a, f1c and the bulb lower part 12b is cooled by the cooling air f2a, f2c. The seal part 13 is cooled by the cooling air f1b, f2b.

In FIG. 6B, the positions of the bulb upper part 12a and the bulb lower part 12b is dependent on the installation position of the projector device. That is to say, if the installation plane of the projector device turns by an angle S, the lamp unit 10 turns by the angle S around an X-axis, such that the positions of the bulb upper part 12a and the bulb lower part 12b are moved on the circumference of the bulb 12. In conjunction with this movement, it is necessary to control the amounts of the lamp-cooing air f1a, f1c and f2a, f2c. The amounts of the cooling air f1a, f1c depend on the rotational frequency of the first cooling fan 53 and the widths L1, L3 of the air inlets 21a, 21c illustrated in FIG. 4. Similarly, the amounts of the cooling air f2a, f2c depend on the rotational frequency of the second cooling fan 54 and the widths L1, L3 of the air inlets 22a, 22c illustrated in FIG. 4. Thus, the rotational frequencies of the first and second cooling fans 53, 54 are controlled in accordance with the installation position so as to blow the optimum amounts of cooling air to the bulb upper part 12a and the bulb lower part 12b, thereby keeping the bulb 12 at an appropriate temperature.

The position of the seal part 13 is invariably located at the center of the rotation without being dependent on the installation position, and a fixed amount of air only needs be blown to the seal part 13. An amount of air obtained as a result of an addition of the lamp-cooing air f1b and f2b to each other is blown to the seal part 13. However, the cooling air f1b depends on the rotational frequency of the first cooling fan 53 and the width L2 of the air inlet 21b; and the cooling air f2b depends on the rotational frequency of the second cooling fan 54 and the width L2 of the air inlet 22b. As the width L2 is fixed, the rotational frequencies of the cooling fans 53, 54 are controlled so as to keep the seal part 13 at an appropriate temperature.

According to the configuration of the cooling mechanism of the present example, nothing obstructs the cooling air currents delivered from the cooling fans 53, 54. A loss of the halfway air course can be lessened to suppress the rotational frequencies of the cooling fans. The reduced noise of the projector device can be thereby achieved.

FIGS. 7A to 7D illustrate four typical positions as the installation positions of the projector device. The installation angle S is here defined according to how much the projection direction (the +Z direction) turns around the X-axis when the stationary installation is assumed as a reference S=0 degree.

Figure 7A:
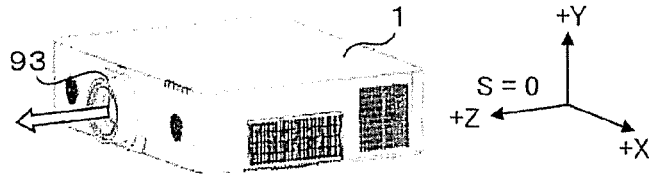
FIG. 7A illustrates an installation position (stationary installation) of the projector device.

FIG. 7A illustrates a case of the stationary installation having an installation angle S=0 and a mode where the projector device 1 is installed on a desk or the like and images are projected onto a blackboard or a screen from the projection lens 93.

Figure 7B:
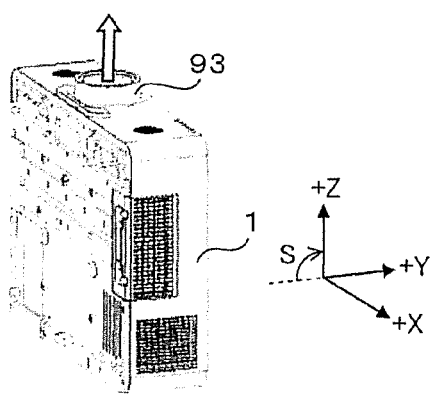
FIG. 7B illustrates the installation position (upward-projecting installation) of the projector device.

FIG. 7B illustrates a case of the upward-projecting installation having an installation angle S=90 degrees and a mode where the projection direction of the projector device is oriented upward and images are projected onto a ceiling, for example.

Figure 7C:
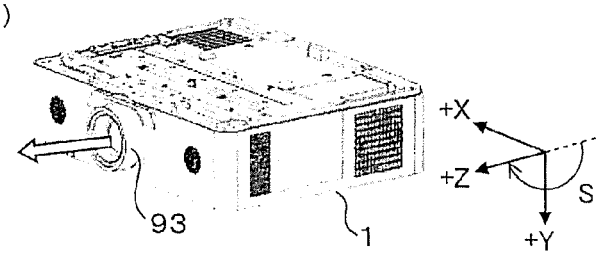
FIG. 7C illustrates the installation position (suspended installation) of the projector device.

FIG. 7C illustrates a case of the suspended installation having an installation angle of S=180 degrees and a mode where the projector device is inversely attached to a ceiling or the like and images are projected onto the blackboard or a screen.

Figure 7D:
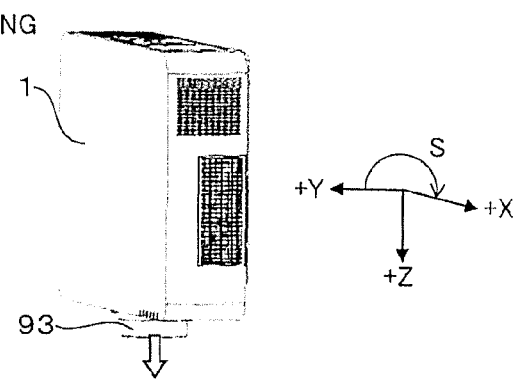
FIG. 7D illustrates the installation position (downward-projecting installation) of the projector device.

FIG. 7D illustrates a case of the downward-projecting installation having an installation angle of S=270 degrees and a mode where the projector device 1 is attached to a ceiling or the like and images are projected toward a floor.

FIGS. 8A to 8D illustrate the cooling air in the lamp unit 10 which assumes the respective installation positions of FIGS. 7A to 7D. All the figures are front cross-sectional views of the lamp unit 10 and schematically illustrate the cooling air directed toward the bulb upper part 12a and the bulb lower part 12b.

Figure 8A:
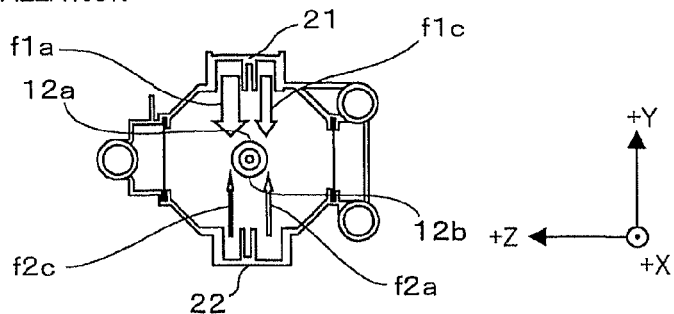
FIG. 8A illustrates cooling air in the lamp unit in an installation position (stationary installation).

FIG. 8A illustrates a case of the stationary installation (the installation angle S=0 degree), in which the lamp-cooing air f1a and f1c is blown to the bulb upper part 12a and the lamp-cooing air f2a, f2c is blown to the bulb lower part 12b. The magnitude relationship among the amounts of cooling air is indicated with the thicknesses of arrows. Specifically, the cooling air f1a, f1c on the air inlet 21 side is set up at a large amount and the cooling air f2a, f2c on the air inlet 22 side is set up at a small amount. The bulb upper part 12a is strongly cooled through the setup. The lamp-cooing air f1b, f2b is blown to the seal part 13 regardless of the installation position.

Figure 8B:
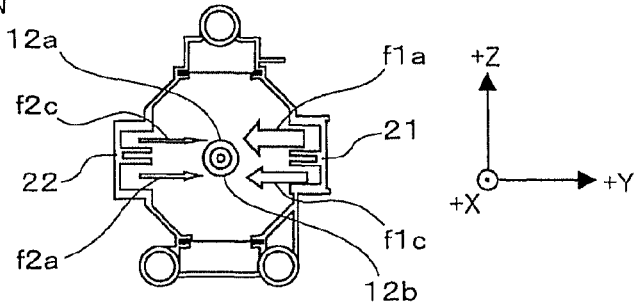
FIG. 8B illustrates cooling air in the lamp unit in an installation position (upward-projecting installation).

FIG. 8B illustrates a case of the upward-projecting installation (an installation angle S=90 degree), in which the lamp-cooing air f1a, f2c is blown to the bulb upper part 12a and the lamp-cooing air f1c, f2a is blown to the bulb lower part 12b. In this case, the cooling air f1a, f1c on the air inlet 21 side is enlarged and a difference between the cooling air f1a and f1c (a difference between the widths L1 and L3 ) causes the bulb upper part 12a to be strongly cooled.

Figure 8C:
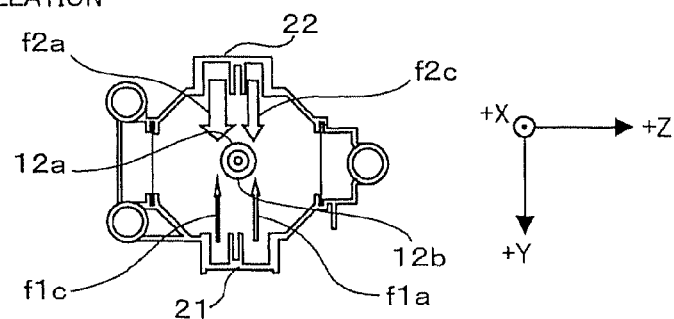
FIG. 8C illustrates cooling air in the lamp unit in an installation position (suspended installation).

FIG. 8C illustrates a case of the suspended installation (an installation angle S=180 degrees), in which the lamp-cooing air f2a, f2c is blown to the bulb upper part 12a and the lamp-cooing air f1a, f1c is blown to the bulb lower part 12b. In this case, the cooling air f2a, f2c on the air inlet 22 side in enlarged to strongly cool the bulb upper part 12a.

Figure 8D:
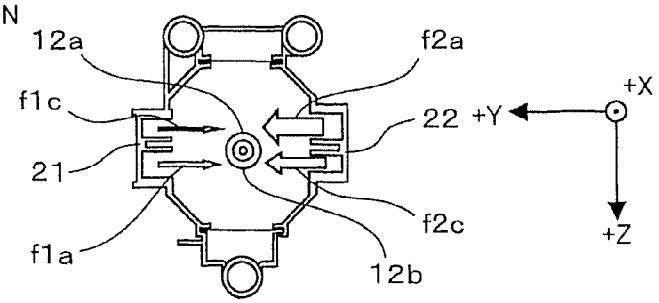
FIG. 8D illustrates cooling air in the lamp unit in an installation position (downward-projecting installation).

FIG. 8D illustrates a case of the downward-projecting installation (an installation angle S=270 degrees), in which the lamp-cooing air f1c, f2a is blown to the bulb upper part 12a and the lamp-cooing air f1a, f2c is blown to the bulb lower part 12b. In this case, the cooling air f2a and f2c on the air inlet 22 side is enlarged and a difference between f2a and f2c (a difference between the widths L1 and l3 ) causes the bulb upper part 12a to be strongly cooled.

The installation position may have an installation angel S other than the installation angles mentioned above (for example, S=135 degrees). Also in such a case, the amounts of the cooling air f1a, f1c on the air inlet 21 side and of the cooling air f2a, f2c on the air inlet 22 side are controlled to increase the amount of air directed to the bulb upper part 12a, thereby making it possible to strongly cool the bulb upper part 12a. This is because of the following effect: a pair of the cooling air f1a and f1c (or f2a and f2c) blown to the bulb 12 from the same direction is offset in the Z direction, and the cooling air comes around the bulb 12.

Figure 9:
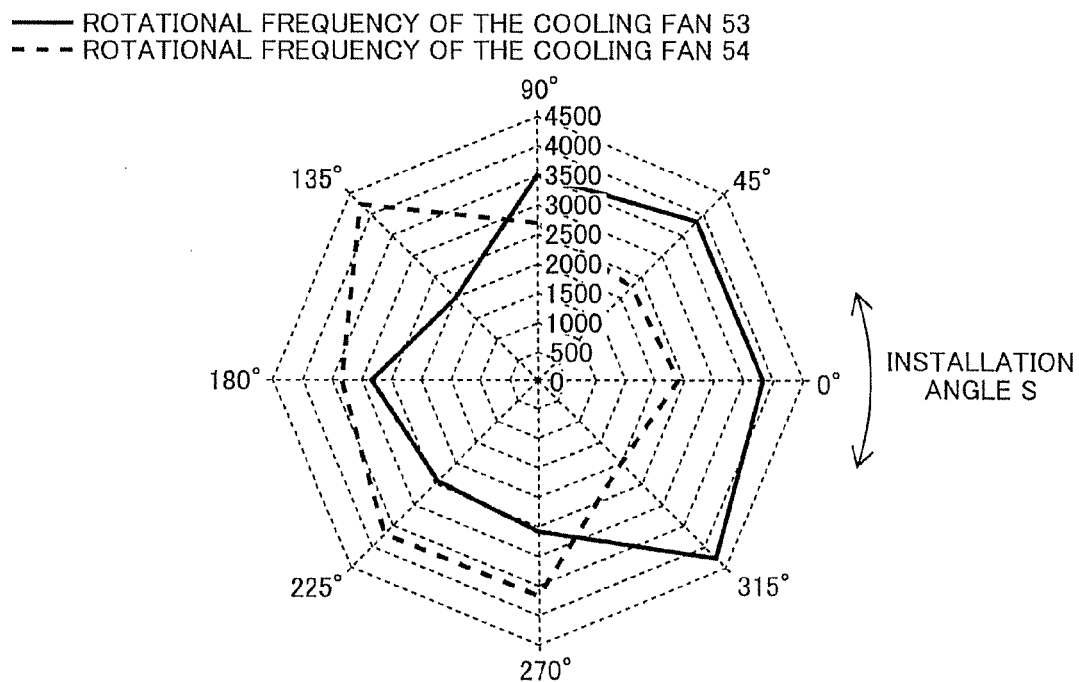
FIG. 9 shows the appropriate rotational frequencies of cooling fans 53, 54 for the associated installation positions.

FIG. 9 illustrates the appropriate rotational frequencies of the first and second cooling fans 53, 54 with respect to the associated installation positions of the projector device. The installation angle S is indicated at intervals of 45 degrees from 0 to 360 degrees. Environmental conditions are such that outside air temperature is 25° C. and outside atmospheric pressure is 1013 hPa. In this example, the rotational frequencies of the cooling fans are appropriately controlled in a range from 2000 to 4200 rpm, whereby the bulb upper part 12a and bulb lower part 12b of the discharge lamp 11 and the seal part 13 can each be maintained at an appropriate temperature. This result is only one of the examples. Needless to say, the optimal conditions depend on the structures of the discharge lamp 11 and the cooling mechanism (the cooling fans) of the lamp. The optimal conditions can be obtained through interpolation even if the installation position (the installation angle) is other than the above ones.

Figure 10:
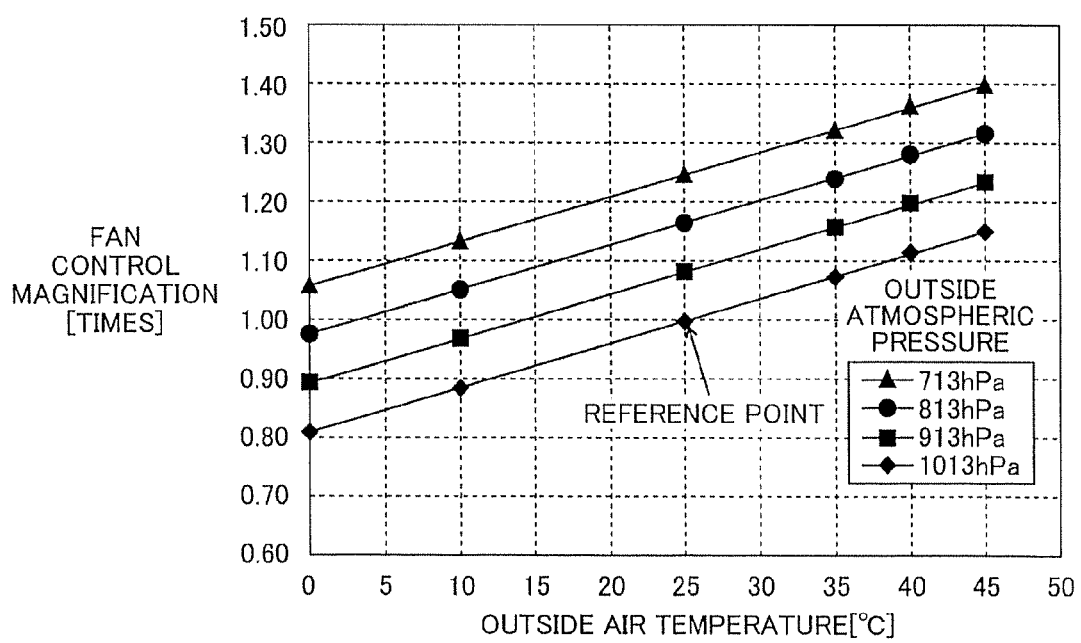
FIG. 10 shows dependency of the appropriate rotational frequency of the cooling fan on environmental conditions.

FIG. 10 shows dependency of the appropriate rotational frequency of the cooling fan on environmental conditions. FIG. 10 shows the variation of the appropriate rotational frequency encountered in magnification on the basis of the appropriate rotational frequency of the cooling fan under an outside air temperature of 25° C. and an outside atmospheric temperature of 1013 hPa when outside air temperature and outside atmospheric pressure change. This means that the rotational frequency only needs to be corrected by this magnification in accordance with the environmental conditions. At the time of the outside air temperature being high or the outside atmospheric pressure being low, the cooling efficiency of the cooling fan falls. A correction to increase the rotational frequency of the cooling fan is performed hence.

In the present example, the results of the FIGS. 9 and 10 are used to optimally control the rotational frequencies of the cooling fans 53, 54. The data of FIGS. 9 and 10 are stored in a memory. The installation angle sensor 82 detects the position (the installation angle S) of the projector device 1. The outside air temperature sensor 83 detects outside air temperature. The outside atmospheric pressure sensor 84 detects outside atmospheric pressure. On the basis of the detection inform the microcomputer 80 sets up the rotational frequencies of the cooling fans 53, 54 so as to keep the discharge lamp 11 at an appropriate temperature. Specifically, the optimal rotational frequencies of the cooling fans 53, 54 in accordance with the installation angle S are read out with reference to the data of FIG. 9. In addition, the magnification (the correction amount) of the rotational frequencies according to the outside air temperature and the outside atmospheric pressure is readout with reference to the data of FIG. 10. The appropriate rotational frequencies are multiplied by the associated magnifications to set up the respective optimal rotational frequencies. Instructions to control the rotational frequencies of the cooling fans 53, 54 are given to the fan power circuit 87.

Figure 11A:
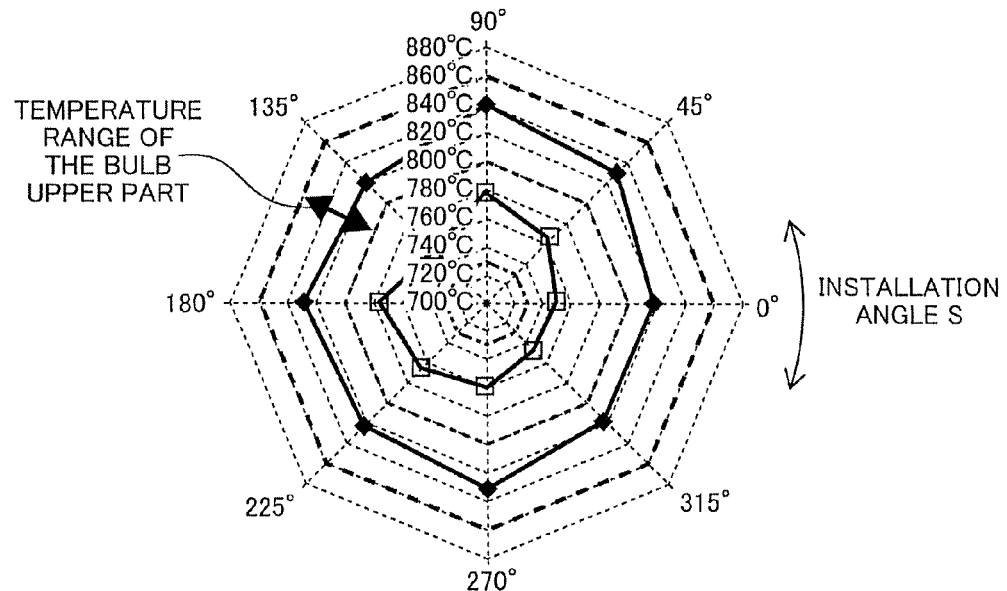
FIG. 11A illustrates temperature characteristics of a discharge lamp (a bulb upper part and a bulb lower part) in the installation positions.
Figure 11B:
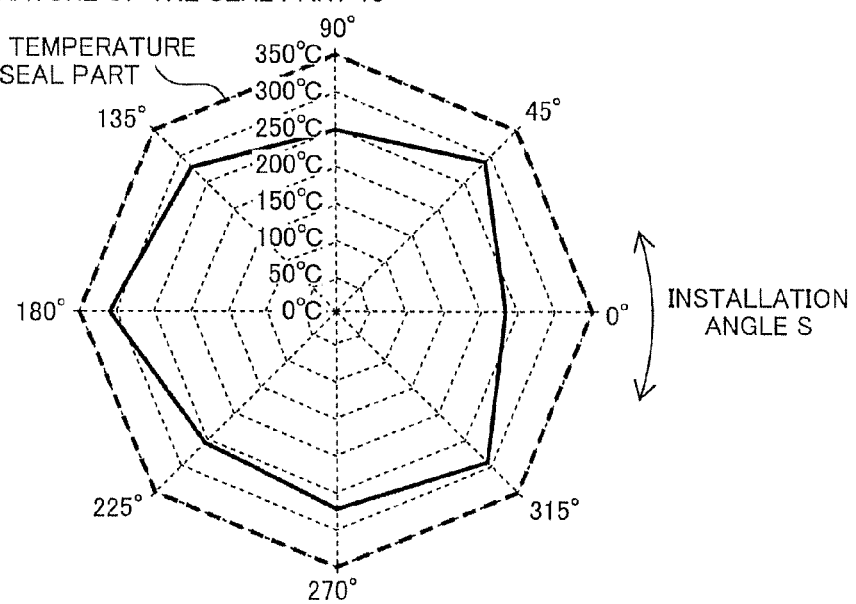
FIG. 11B illustrates temperature characteristics of the discharge lamp (a seal part) in the installation positions.

FIGS. 11A and 11B show the temperature characteristics of the discharge lamp 11 in the installation positions in the present example. Operating conditions are in the case where the discharge lamp that has been turned on is cooled through rotating the cooling fans 53, 54 at the appropriate rotational frequencies shown in FIGS. 9 and 10.

FIG. 11A shows the temperatures of the bulb upper part 12a and the bulb lower part 12b, as well as shows installation angle dependency with a solid line. FIG. 11A further shows, as one example of the temperature specifications of the discharge lamp, the upper limit temperature 860° C. and lower limit temperature 800° C. of the bulb upper part 12a and the lower limit temperature 730° C. of the bulb lower bulb 12b with a dotted line (a chained line). As a result, the cooling mechanism of the present example can satisfy the temperature specifications of the bulb upper part 12a and the bulb lower part 12b at any installation position including the intermediate angle of the installation angle S=135 degree.

FIG. 11B shows the temperature of the seal part 13 and its temperature characteristics with a solid line. FIG. 11B further shows upper limit temperature 350° C. as one example of the temperature characteristics of the seal part 13 with a dotted line. The cooling mechanism of the present example can satisfy the temperature specifications of the seal part 13 at any installation position as a result.

A description is given of the procedure of the cooling operation for the discharge lamp in the projector device of the present example.

(1) The operation section 81 is operated to power on the projector device 1.

(2) The installation angle sensor 82, the outside air temperature sensor 83, and the atmospheric pressure sensor 84 detect the installation angle of the projector device, outside air temperature, and outside atmospheric pressure, respectively.

(3) The microcomputer 80 acquires inform on an installation angle to obtain the appropriate rotational frequencies of the cooling fans 53, 54 with reference to the data of the installation angle dependency of FIG. 9.

(4) The microcomputer 80 further acquires inform on outside air temperature and outside atmospheric pressure, multiplies the appropriate rotational frequencies of the cooling fans 53, 54 by the magnification (the correction amount) with reference to the data on the environment condition dependency in FIG. 10, and sets up the optimal rotational frequencies.

(5) The microcomputer 80 controls the fan power circuit 87 to rotate the cooling fans 53, 54 at optimal rotational frequencies each.

(6) The cooling air generated by the cooling fan 53 is led to the lamp-cooing air inlet 21 via the duct 71 and separated into the lamp-cooing air currents f1a, f1b, f1c by the divided air inlets 21a, 21b, 21c.

(7) Similarly, the cooling air generated by the cooling fan 54 is led to the lamp-cooing air inlet 22 via the duct 72 and separated into the lamp-cooing air currents f2a, f2b, f2c by the divided air inlets 22a, 22b, 22c.

(8) The separated cooling air currents f1a, f1b and the cooling air currents f2a, f2b are blown to the upper part 12a or lower part 12b of the bulb 12. The positions (the upper part 12a or the lower part 12b) of the bulb 12 to which the cooling air is blown depend on the installation position (the installation angle) of the projector device as illustrated in FIGS. 8A to 8D.

(9) The separated cooling air currents f1b, f2b, which are blown to the seal part 13, are constant regardless of the installation position of the projector device.

As described above, the projector device of the present example can keep the bulb upper part 12a and bulb lower part 12b of the discharge lamp 11 and the seal part 13 at the appropriate temperatures each in any installation position.

Example 2

Example 2 describes a case where two projector devices are accommodated in a common housing and operated as a single projector device. To realize a high-end projector device that emphasizes brilliance, two middle class (middle brilliance) projector devices are simultaneously operated to project the same superposed images, thereby making it possible to realize twofold brilliance. Such a device structure is here called "a combined projector device". The cooling mechanism of the present invention can be applied to the combined projector device.

Figure 12:
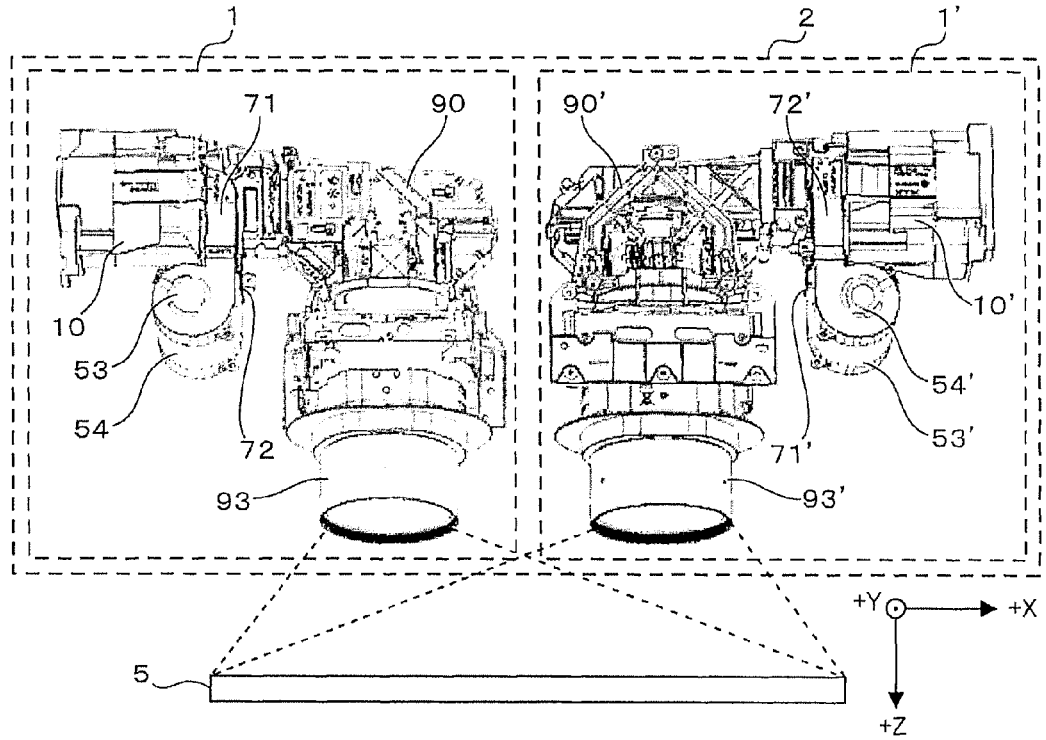
FIG. 12 is an external view of an optical system and a cooling mechanism in a combined projector device according to Example 2 of the present invention.

FIG. 12 is an external view of an optical system and a cooling mechanism of a combined projector device according to Example 2 of the present invention.

A combined projector device 2 has two projector devices 1, 1' accommodated in a common housing. The projector device 1, one of the two devices (on the left in the figure), has the same structure as that of the projector device 1 of Example 1 and also coordinate axes are determined in a similar way. The other (on the right in the figure) projector device 1' is disposed so as to fold back the projector device 1 mirror-symmetrically with respect to a Z-axis. Specifically, an optical unit 90' (a projection lens 93') of the projector device 1' is configured to be the same as the optical unit 90 (the projection lens 93) of the projector device 1 in the Z and Y directions and to reverse the optical unit 90 in the X direction. A lamp unit 10' and a cooling mechanism (cooling fans 53', 54' and ducts 71', 72') of the projector device 1' are configured to be the same as the lamp unit 10 and cooling mechanism (the cooling fans 53, 54 and the ducts 71, 72) of the projector device 1 in the Z direction and to reverse the lamp unit 10 and the cooling mechanism in the X and Y directions. In other words, the cooling mechanism of the projector device 1' is such that the cooling mechanism of the projector device 1 turns (upside down) at 180 degrees around the Z-axis. The positions of the two cooling fans 53', 54' and the two ducts 71', 72' are switched in the Y direction.

In the combined projector device 2, the projector device 1 and the projector device 1' are simultaneously operated. The microcomputer 80, the various sensors 82, 83, 84, the display drive circuit 85, the various power circuits 86, 87, etc. in Example 1 (FIG. 1) are shared by the projector devices 1, 1'.

It is also necessary for the combined projector device 2 to keep the discharge lamps of the projector devices 1, 1' at appropriate temperatures however position the combined projector device 2 is installed to be. The cooling operation of the projector device 1 only needs to be performed through setting up the rotational frequencies of the cooling fans 53, 54 to the installation position of the combined projector device in a manner described in Example 1 (FIG. 9). However, the cooling mechanism of the projector device 1' switches the Y directional arrangement with the cooling mechanism of the projector device 1. The cooling control for the projector device 1' is exercised by reversing the cooling control for the projector device 1 in the Y direction. Specifically, the first cooling fan 53' of the projector device 1' is controlled similarly to the second cooling fan 54 of the projector device 1. The second cooling fan 54' of the projector device 1' is controlled similarly to the first cooling fan 53 of the projector device 1.

Figure 13:
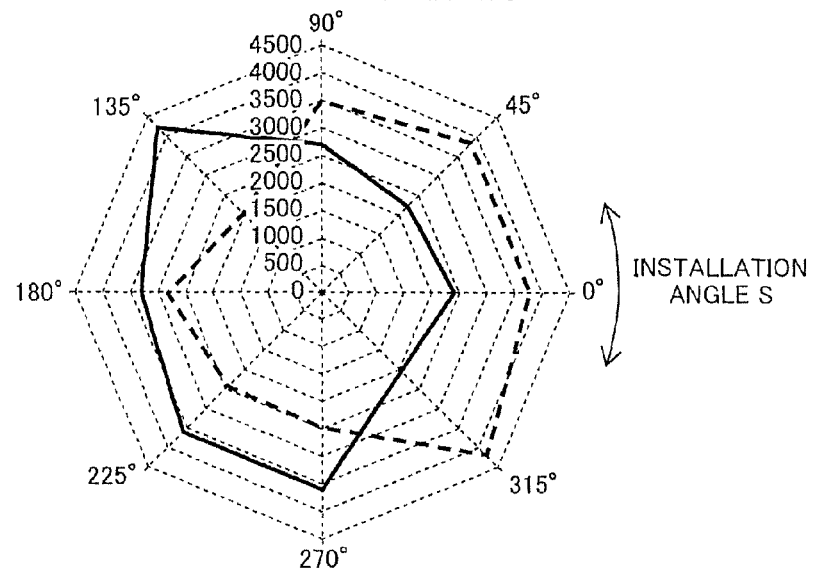
FIG. 13 shows appropriate rotational frequencies of cooling fans 53', 54' on the projector device 1' side with respect to the installation positions of the combined projector device.

FIG. 13 is a graph showing the appropriate rotational frequencies of the first and second cooling fans 53', 54' on the projector device 1' side with respect to the installation positions of the combined projector device. The installation angle S is shown at intervals of 45 degrees from 0 to 360 degrees. Environmental conditions are such that outside air temperature is 25° C. and outside atmospheric pressure is 1013 hPa. The results are obtained by being switched with the appropriate rotational frequencies of the first and second cooling fans 53, 54 in Example 1 (FIG. 9). In this way, the projector device 1' can keep the bulb upper part and bulb lower part of the discharge lamp and the seal part at appropriate temperatures as well.

FIGS. 14A-14D illustrate cooling air in the lamp unit 10' on the projector device 1' side in the installation positions in FIGS. 7A-7D. The cooling air in the lamp unit 10 on the projector device 1 side is as shown in FIGS. 8A-8D. Symbols for the various parts and cooling air in the projector device 1' are each provided with a dash (').

Figure 14A:
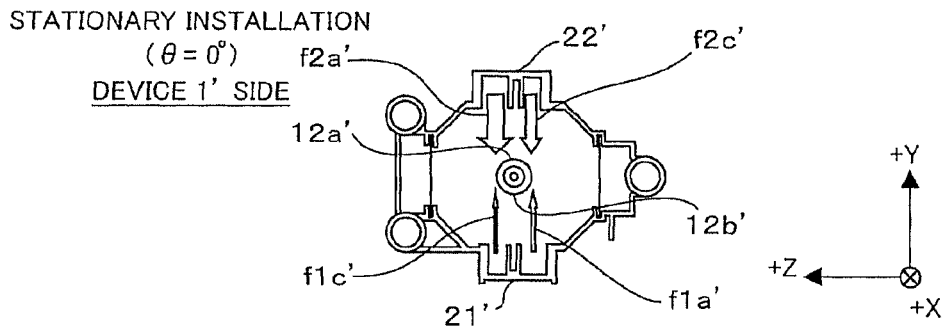
FIG. 14A illustrates cooling air in a lamp unit on the projector device 1' side in an installation position (stationary installation).

FIG. 14A illustrates a case of the stationary installation (the installation angle=0 degree), in which lamp-cooing air f2a', f2c' is blown to the bulb upper part 12a' and lamp-cooing air f1a', f1c' is blown to the bulb lower part 12b'. The amounts of cooling air f2a', f2c' on the air inlet 22' side are increased to strongly cool the bulb upper part 12a'. This is similar to FIG. 8C (located on the projector 1 side, and the installation angle S=180 degrees).

Figure 14B:
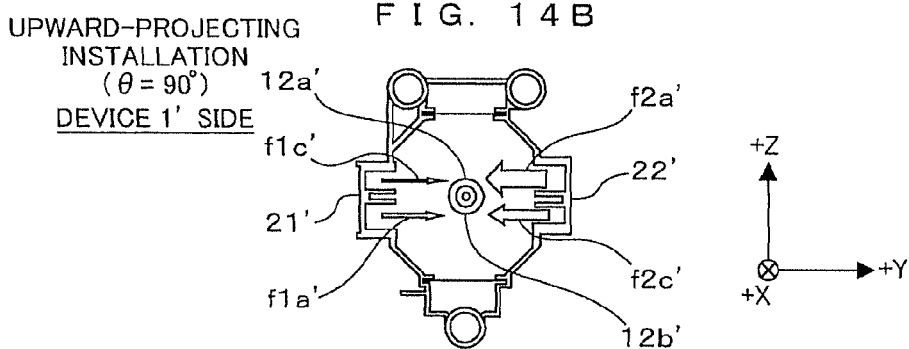
FIG. 14B illustrates cooling air in the lamp unit on the projector device 1' side in the installation position (the upward-projecting installation).

FIG. 14B illustrates a case of the upward-projecting installation (the installation angle S=90 degrees). Lamp-cooing air f1c', f2a' is blown to the bulb upper part 12a' and lamp-cooing air f1a', f1a' is blown to the bulb upper part 12a'. This is similar to FIG. 8D (located on the projector 1 side, and an installation angle S=270 degrees).

Figure 14C:
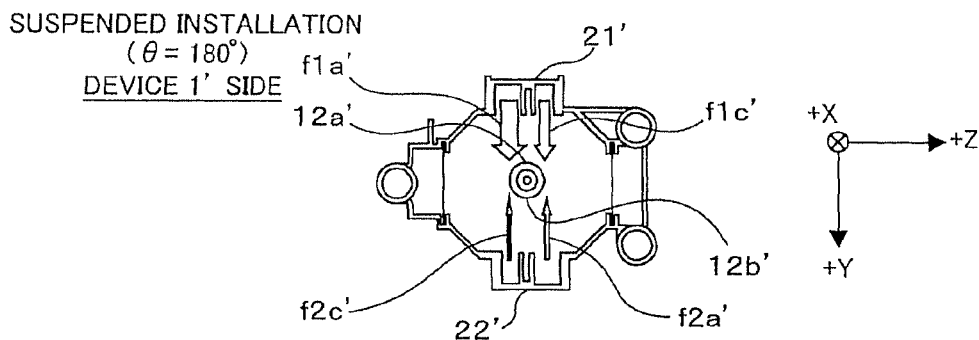
FIG. 14C illustrates cooling air in the lamp unit on the projector device 1' side in the installation position (the suspended installation).

FIG. 14C illustrates a case of the suspended installation (the installation angle S=180 degrees). Lamp-cooing air f1a', f1c' is blown to the bulb upper part 12b' and lamp-cooing air f2a', f2c' is blown to the bulb lower part 12b'. This is similar to FIG. 8A (located on the projector device 1 side, and an installation angle S=0 degree).

Figure 14D:
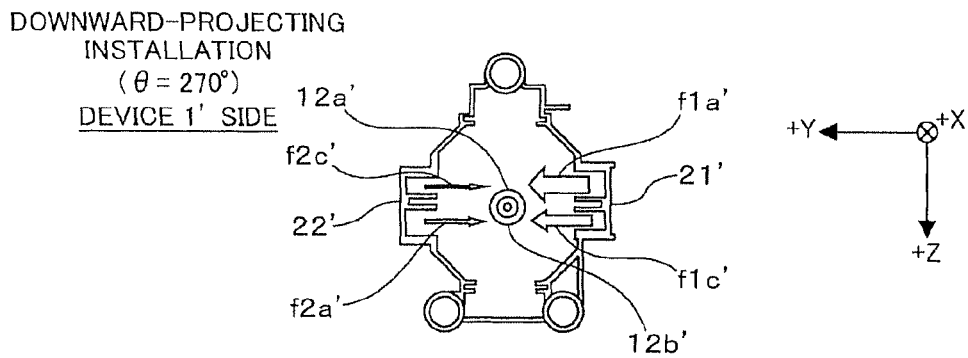
FIG. 14D illustrates cooling air in the lamp unit on the projector device 1' side in the installation position (the downward-projecting installation).

FIG. 14D illustrates a case of the downward-projecting installation (the installation angle S=270 degrees). Lamp-cooing air f1a', f2ac' is blown to the bulb upper part 12a' and lamp-cooing air f1c', f2a' is blown to the bulb lower part 12b'. This is similar to FIG. 8B (located on the projector device 1 side, and an installation angle S=90 degrees).

As described above, the control on the cooling fans 53', 54' in the projector device 1' only needs to be performed by controlling the projector device 1 with the installation angle S turns at 180 degrees. In this way, the bulb upper part and bulb lower part of the discharge lamp can be kept at appropriate temperatures at any installation position in the combined projector device. The commonalized cooling mechanisms of the two projector devices in Example 2 makes the cooling control easy and reduces manufacturing costs at the same time.

REFERENCE SIGNS LIST 1, 1': Projector device
2: Combined projector device
5: Screen
10, 10': Lamp unit
11: Discharge lamp
12: bulb
12a: Bulb upper part
12b: Bulb lower part
13: Seal part
14: Reflector
21, 21a, 21b, 21c: Lamp-cooing air inlet
22, 22a, 22b, 22c: Lamp-cooing air inlet
23a, 23b: Lamp cool air discharge outlet
24: Fixed frame
33: Explosion-proof glass
53, 54, 55: Cooling fan
60: Division plate
71, 72: Dust
73, 74: Flow guide rib
80: Microcomputer
81: Operation section
82: Installation angle sensor
83: Outside air temperature sensor
84: Atmospheric pressure sensor
85: Display drive circuit
86: Lamp power circuit
87: Fan power circuit
90, 90': Optical unit
91: Illumination optical system
92: Display panel
93: Projection lens
f1a, f1b, f1c, f2a, f2b, f2c: Lamp-cooing air

The invention claimed is:

1. A projector device which projects an image by use of a discharge lamp as a light source, comprising:
    a cooling mechanism configured to lead cooling air generated by a first cooling fan and a second cooling fan to a first lamp-cooing air inlet and a second lamp-cooing air inlet via a first duct and a second duct, respectively, and configured to blow the first and second cooling air to the discharge lamp in order to cool the discharge lamp;
    an installation angle sensor configured to detect an installation position of the projector device; and
    a cooling control section configured to control a rotational frequency of the first and second cooling fans in accordance with the installation position detected by the installation angle sensor, wherein the first and second lamp-cooing air inlets are disposed symmetrically with respect to an optical axis of the discharge lamp, and the openings of the first and second lamp-cooing air inlets are disposed in the direction toward the optical axis of the discharge lamp, wherein the first and second lamp-cooing air inlets are each divided into a plurality of air inlets having a different opening area from each other, and each opening of the plurality of divided air inlets are arranged symmetrically about a point with respect to the optical axis of the discharge lamp, and wherein cooling air is divided into a plurality of currents of the cooling air through the plurality of air inlets, the plurality of currents of the cooling air different in an amount according to the opening area of every air inlets being blown to a different part of the discharge lamp.

2. The projector device according to claim 1, wherein the cooling air divided into the plurality of currents of the cooling air is partially blown to a bulb of the discharge lamp, and wherein the cooling control section controls the first and second cooling fans to cause an amount of cooling air for an upper part of the bulb in a direction of gravitational force depending on the installation position of the projector device to become greater than an amount of cooling air for a lower part of the bulb in the direction of gravitational force.

3. The projector device according to claim 2, wherein the cooling air divided into the plurality of currents of cooling air is partially blown to a seal part of the discharge lamp.

4. The projector device according to claim 2, further comprising:

an outside air temperature sensor configured to detect an outside air temperature; and an atmospheric pressure sensor configured to detect an outside atmospheric pressure;

wherein the cooling control section corrects the rotational frequency of the first and second cooling fans in accordance with a detected outside air temperature and a detected atmospheric pressure.

5. The projector device according to claim 1, wherein the first cooling fan and the first duct, and the second cooling fan and the second duct are each symmetrically structured so as to face each other and to have a cooling air flow passage with an equal length.

6. The projector device according to claim 1, wherein the first and second ducts are each internally provided with a flow guide rib for guiding current of cooling air.

7. A combined projector device that uses two of the projector devices according to claim 1 to be accommodated in a common housing and that projects a same superposed image, wherein the discharge lamps and the cooling mechanisms in the respective projector devices have a same structure and either of the cooling mechanisms is disposed such that the other cooling mechanism turns around a projection axis at 180 degrees, and wherein the cooling control sections of the respective projector devices are configured to be a common cooling control section and configured to control the first and second cooling fans of the respective projector devices in a switched manner.

* * * * *

UNITED STATES PATENT AND TRADEMARK OFFICE
CERTIFICATE OF CORRECTION

| | |
|---|---|
| PATENT NO. | : 9,678,415 B2 |
| APPLICATION NO. | : 14/359397 |
| DATED | : June 13, 2017 |
| INVENTOR(S) | : Hideharu Saito |

Page 1 of 1

It is certified that error appears in the above-identified patent and that said Letters Patent is hereby corrected as shown below:

On the Title Page

Item (57) ABSTRACT should read:

(57) ABSTRACT
In order to cool the discharge lamp, cooling air generated by first and second cooling fans is conveyed via first and second ducts into first and second lamp-cooling air inlets of the discharge lamp, and is blown into the discharge lamp. The first and second lamp-cooling air inlets are disposed so as to be symmetrical with respect to the optical axis of the discharge lamp, and are divided into a plurality of air inlets each having different opening surface areas. Having passes through the plurality of air inlets and diverging into a plurality of air currents, the cooling air is respectively blown to different parts of the discharge lamp. The rotational frequency of the first and second cooling fans is optimally controlled in accordance with the installation position (S) of the projector device.

Signed and Sealed this
Twenty-sixth Day of September, 2017

Joseph Matal
*Performing the Functions and Duties of the
Under Secretary of Commerce for Intellectual Property and
Director of the United States Patent and Trademark Office*